United States Patent [19]
Polizzi

[11] 3,850,078
[45] Nov. 26, 1974

[54] SYSTEM FOR AUTOMATIC PERIODIC IRRIGATION

[76] Inventor: Daniel D. Polizzi, 630 W. 8th St., Upland, Calif. 91786

[22] Filed: Mar. 17, 1972

[21] Appl. No.: 235,638

[52] U.S. Cl............................ 91/38, 91/219, 92/8, 137/624.14
[51] Int. Cl. ... F15b 21/02, F01l 31/00, F15b 15/22
[58] Field of Search........... 91/35, 38, 39, 219, 344; 92/8, 9, 10, 11, 12; 239/70; 137/624.14

[56] References Cited
UNITED STATES PATENTS

| 701,265 | 5/1902 | Harriman | 92/9 |
|---|---|---|---|
| 1,551,372 | 8/1925 | Crocher | 92/9 |
| 2,286,026 | 6/1942 | Towler et al. | 91/344 |
| 2,997,030 | 8/1961 | King | 91/38 |
| 3,160,486 | 12/1964 | Busch | 91/38 |
| 3,176,801 | 4/1965 | Huff | 92/9 |
| 3,268,271 | 8/1966 | Yackle | 91/219 |
| 3,282,294 | 11/1966 | Corniello | 137/624.14 |
| 3,334,547 | 8/1967 | Grundmann | 91/219 |
| 3,524,383 | 8/1970 | Locke | 91/35 |
| 3,687,013 | 8/1972 | Haller | 92/8 |

Primary Examiner—Irwin C. Cohen
Assistant Examiner—A. M. Zupcic
Attorney, Agent, or Firm—Jess M. Roberts

[57] ABSTRACT

In cooperation with a pipeline conveying water under pressure, a hydraulic actuator carries out a cycle of releasing water for irrigation and a hydraulic timer provides predetermined time intervals between the release cycles. The actuator and the timer both employ pistons to displace given volumes of liquid at given retarded rates.

9 Claims, 3 Drawing Figures

SYSTEM FOR AUTOMATIC PERIODIC IRRIGATION

BACKGROUND OF THE INVENTION

Various systems have been proposed for automatically carrying out a sprinkling or irrigation operation at predetermined time intervals. Such systems are disclosed, for example, in Stewart et al U.S. Pat. No. 1,704,374; Longbotham et al U.S. Pat. No. 1,875,623; Forrester U.S. Pat. No. 2,912,215; and Crow U.S. Pat. No. 3,078,866. For various reasons, these prior art disclosures have not been widely used, and there exists a pressing need for a reliable, simple, trouble-free, automatic irrigation system capable of functioning with high accuracy to carry out irrigation operations with relatively long time intervals between operations, for example, time intervals of 12-24 hours.

SUMMARY OF THE INVENTION

A hydraulic actuator to open one or more valves for release of water for a predetermined period of time employs water pressure to move an actuating piston and the liquid displaced by the piston is metered to prolong the irrigation operation to whatever extent is desired. A hydraulic timer to determine the intervals of time between the irrigation operations also employs a piston to displace a volume of liquid at a predetermined retarded rate. The hydraulic actuator may, for example, open and close valve means or may open and close an irrigation gate.

In one practice of the invention disclosed herein, the hydraulic actuator carries out an irrigation operation on each of its two opposite strokes and the hydraulic timer measures the desired time interval on each of its two opposite strokes. The movements of both pistons are reversed automatically by 4-way valve means that is operated by each of the two opposite strokes of the interval timer.

The features and advantages of the invention may be understood from the following detailed description and the accompanying drawings.

BRIEF DESCRIPTION OF THE DRAWINGS

In the drawings, which are to be regarded as merely illustrative.

DESCRIPTION OF THE SELECTED EMBODIMENTS OF THE INVENTION

Figure 1:
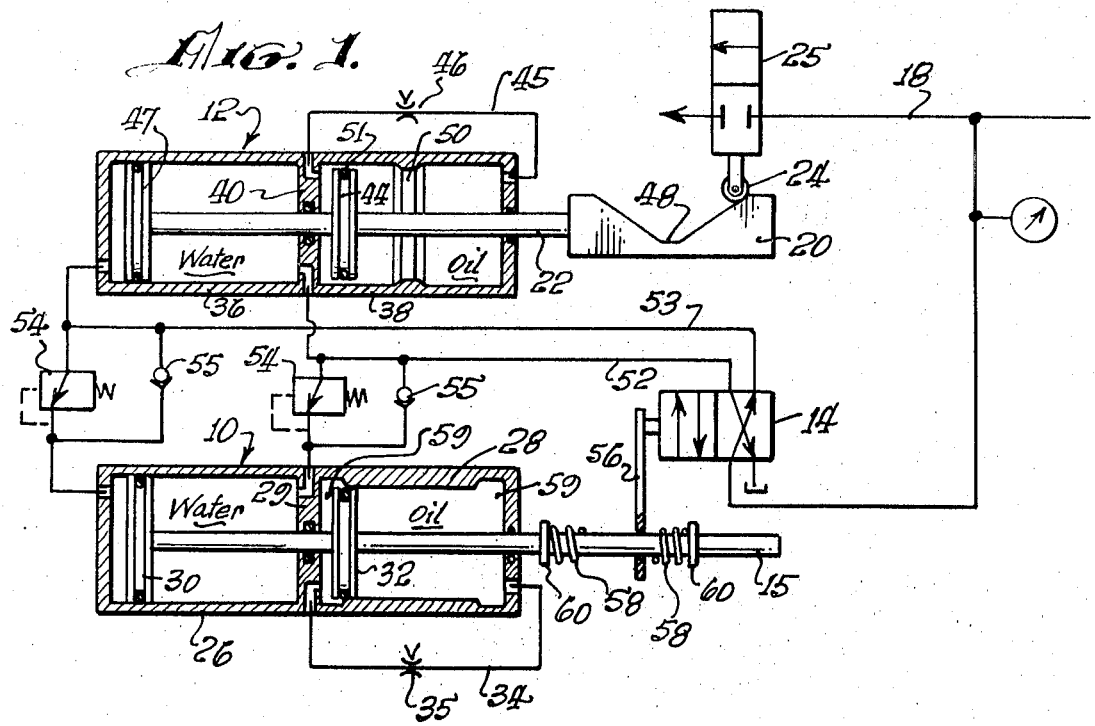
FIG. 1 is a diagrammatic view illustrating an embodiment of the invention which incorporates a single 4-way valve.

The principal parts of the system shown in FIG. 1 include: a hydraulic interval timer, generally designated 10; a hydraulic actuator, generally designated 12; a 4-way valve 14 operated by a piston rod 15 of the hydraulic timer 10 to reverse both the hydraulic timer and the hydraulic actuator; a pressurized water pipeline 18; a cam 20 on the piston rod 22 of the hydraulic actuator; a follower 24 that cooperates with the cam; and a valve 25 that is operated by the follower to release irrigation water from the pipeline 18.

The piston rod 15 of the hydraulic timer 10 extends through two chambers in the form of two cylinders 26 and 28 with the two cylinders positioned end-to-end and separated by a relatively thick dividing wall 29. The cylinder 26 encloses a driving piston 30 on the piston rod 15 which is actuated by pressurized water from the pipeline 18. The second cylinder 28 enclose a driven piston 32 on the piston rod 15 and encloses a body of liquid such as a suitable grade of oil that is not corrosive and does not yield precipitates. The driven piston 32 divides the interior of the cylinder 28 into two variable-volume compartments. Thus, the opposite faces of the driven piston 32 serve as movable walls of the two compartments and the two movable walls are interconnected by the body of the piston 32 itself.

The body of oil in the cylinder 28 circulates between the two variable compartments as the driven piston 32 reciprocates and for this purpose the two opposite ends of the cylinder 28 are interconnected by an exterior by-pass line 34 which is controlled by a variable orifice fitting 35. Preferably, the variable orifice fitting 35 is a needle valve that may be adjusted by fine increments.

The hydraulic actuator 12 also comprises two cylinders 36 and 38 separated by a relatively thick dividing wall 40, the piston rod 22 carrying a driving piston 47 in the cylinder 12 and carrying a driven piston 44 in the cylinder 38. The driving piston 42 is actuated by pressurized water from the pipeline 18 and the driven piston 44 serves to displace a body of suitable oil at a retarded rate. A by-pass 45 interconnects the two opposite ends of the cylinder 38 and is provided with a variable orifice fitting 46 in the form of a needle valve.

The cam 20 may be of the configuration shown with a lower dwell 48 and when the follower 24 is in the lower dwell the valve 25 is wide open. It is contemplated that the driven piston 44 will move relatively rapidly as the follower 24 approaches or leaves the lower dwell 48 but will creep at a retarded rate to prolong the interval of time in which the follower transverse the lower dwell.

To cause the driven piston 44 to function in the desired manner, the cylinder 38 is formed with an inner circumferential rib 50 which is approximately of the same width as the lower dwell 48 and the driven piston 44, which is provided with a circumferential O-ring 51, is dimensioned for making sealing contact with the rib 50. Thus, the driven piston 44 moves rapidly towards or from the rib 50 because the liberal peripheral clearance around the driven piston permits the oil to be readily displaced from one face of the piston to the other. When the driven piston traverses the rib 50, however, no fluid can flow past the periphery of the piston and the displaced oil must flow through the by-pass 45 at a retarded rate that is determined by the adjustment of the needle valve 46.

The reversing valve 14 is a 2 position-4 connection direction valve with one line 52 connecting the valve to both one end of the cylinder 10 and one end of the cylinder 12 and with a second line 53 connecting the valve to both the second end of the cylinder 10 and the second end of the cylinder 12. Two pressure-reducing valves 54 reduce the pressure of water supplied to the opposite ends, respectively, of cylinder 10 and each pressure-reducing valve is in parallel with a corresponding check valve 55.

The valve 14 may be operated in any suitable manner by the reciprocations of the piston rod 15 of the interval timer. In the arrangement shown in FIG. 1 the valve 14 has an operating member 56 that straddles the piston rod 15 between a pair of coil springs 58 that back against corresponding fixed collars 60 on the piston rod. The two collars 60 are so spaced apart that the operating member 56 abuts one of the coil springs 58 as the piston rod approaches each of its two opposite limit positions. Thus, a coil spring 58 exerts progressively increasing force on the operating member 56 as the piston rod 15 approaches a limit position.

The inner circumference of the cylinder 10 is enlarged at each end to provide inner circumferential clearance spaces 59 at the two ends, respectively, of the cylinder. Thus, as the piston 32 approaches each of its two opposite limit positions and the pressure of a spring 58 increases, the piston 32 abruptly accelerates with the consequence that the reversing switch 14 operates with a snap action.

The manner in which this first embodiment of the invention functions for its purpose may be readily understood from the foregoing description. Between periods of operation of the valve 25 to release irrigation water from the pipeline 18, the driven piston 44 of the hydraulic actuator 12 is held stationary at one of its two limit positions by the pressure of water in the cylinder 36 but the driving piston 30 of the hydraulic timer slowly creeps along the length of the cylinder 10 at a retarded rate that is determined by the adjustment of the needle valve 35.

At the end of the predetermined time interval one of the two springs 58 encounters the operating member 56 of the reversing valve 14 and the piston 32 reaches a clearance space 59 with the result that the piston rod 15 accelerates to a limit position to shift the reversing valve from one of its two limit positions to its opposite limit position. The resulting reversal of flow through the valve 14 initiates the slow movement of the driving piston 30 of the interval timer 10 in the opposite direction and simultaneously initiates movement of the driving piston 47 of the hydraulic actuator 12 away from one of its limit positions towards its opposite limit position.

The piston rod 22 that carries the cam 20 moves rapidly until the driven piston 44 of the hydraulic actuator reaches the restricting inner circumferential rib 50 as the follower 24 reaches the lower dwell 48 of the cam 20. The driven piston 44 of the hydraulic actuator then creeps past the restricting rib 50 at a retarded rate that is determined by the adjustment of the needle valve 46 and thus prolongs the period of time in which the valve 25 is held open to release irrigation water from the pipeline 18. The piston rod 22 then remains at one of its limit positions until the reversing valve 14 is actuated again at the end of the predetermined time interval.

When the valve 25 is wide open to release irrigation water from the pipeline 18, the pressure in the pipeline drops from a relatively high magnitude to a relatively low magnitude. If the pipeline 18 were connected directly to the reversing valve 14, the periodic drop in pressure in the pipeline would slow down the movement of the driving piston 30 of the hydraulic timer and thus destroy the accuracy of the timer. A feature of the invention is that the pressure reducing valve 54 ensures that the pressure of the water that is normally supplied to the reversing valve 14 is appreciably lower than the pressure to which the water in the pipeline 18 drops when valve 25 opens. Therefore, the driving piston 30 of the hydraulic actuator is not affected by pressure changes in the pipeline 18 and always moves at a predetermined constant rate.

Figure 2:
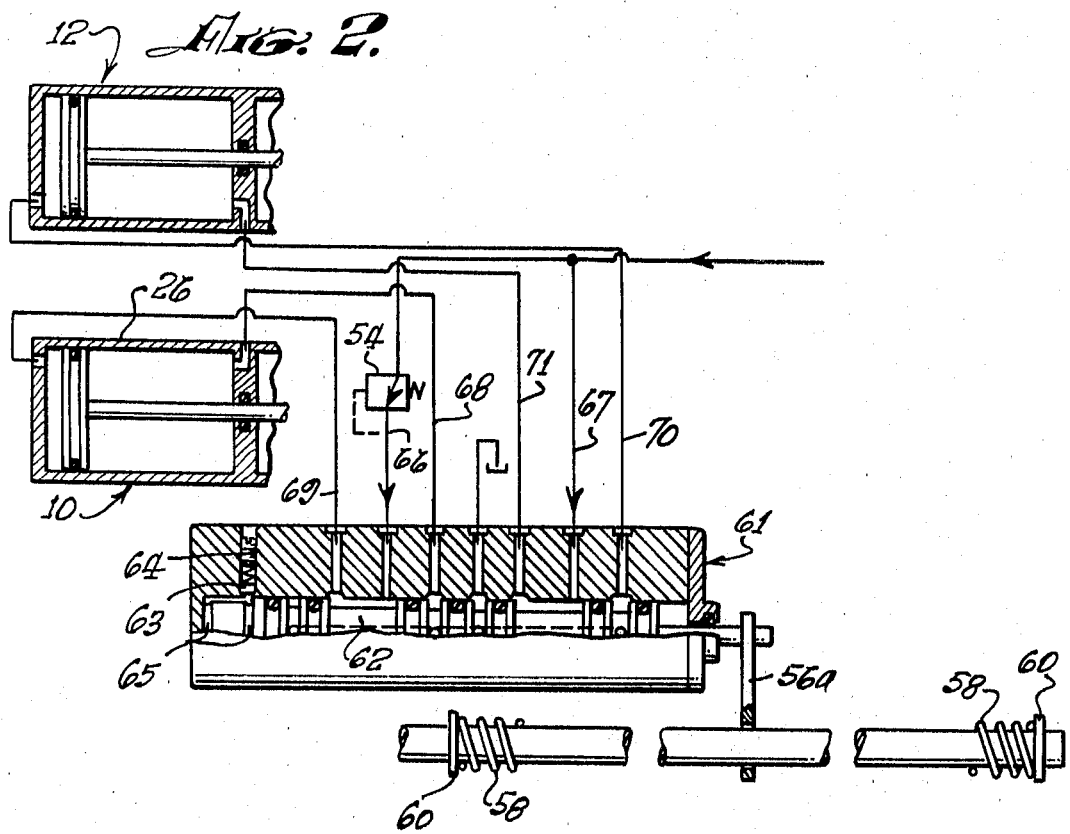
FIG. 2 is a similar diagrammatic view of a second embodiment of the invention which employs two mechanically interconnected 4-way valves.

The second embodiment of the invention illustrated by FIG. 2 employs the same hydraulic actuator 10 as the first embodiment and also employs the same hydraulic actuator 12 as the first embodiment. A new feature in FIG. 2 is the employment of a 4-way reversing valve means, generally designated 61, that employs a valve spool 62 which in effect constitutes two 4-way valve spools united end to end. The valve spool 62 is unitary with an operating member 56a that straddles the piston rod 15 of the hydraulic timer 10 in the previously described manner, the piston rod being provided with the usual pair of spaced coil springs 58 and the corresponding pair of fixed collars 60 to cause the reversing valve 61 to be operated with snap action.

To promote the desired snap action, the reversing valve 61 may incorporate suitable detent means. In the construction shown, a detent ball 63 backed by a coil spring 64 releasably engages two circumferential detent grooves 65 of the spool 62 at the two limit positions respectively of the valve spool.

Water is delivered to the reversing valve 61 by a line 66 through a pressure reducing valve 54 to actuate the interval timer 10 and is delivered by a second line 67 to drive the hydraulic actuator 12. Lines 68 and 69 deliver water alternately to the two opposite ends of the cylinder 26 of the hydraulic timer and lines 70 and 71 deliver water alternately to the two opposite ends of the cylinder 36 of the hydraulic actuator 12. Thus, when the valve spool 64 is shifted with snap portion from one of its two limit positions to the other limit position it reverses both the hydraulic timer and the hydraulic actuator.

The advantage of using the dual 4-way valve 61 is that water is supplied to the two cylinders 26 and 36 independently so that the periodic operation of the hydraulic actuator does not affect the rate of movement of the driving piston 30 of the hydraulic timer. In all other respects the operation of the embodiment shown in FIG. 2 is identical with the operation of the embodiment shown in FIG. 1.

Figure 3:
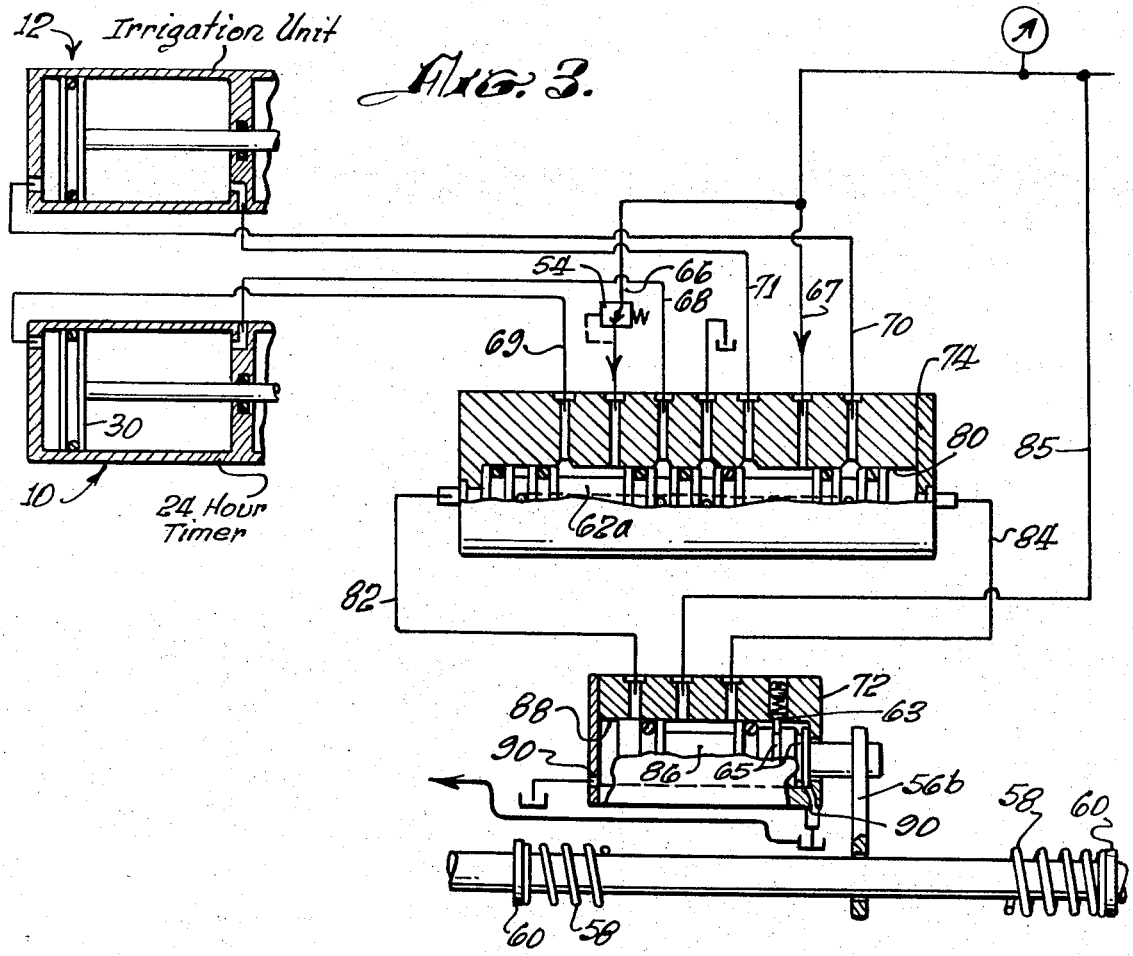
FIG. 3 is a diagrammatic view of a third embodiment of the invention which employs two interconnected 4-way valves in combination with a pilot valve.

The third embodiment of the invention illustrated by FIG. 3 differs from the second embodiment in the use of a pilot wave 72 to operate a reversing valve 74. In all other respects the embodiment shown in FIG. 3 is the same as shown in FIG. 2 and the mode of operation is the same.

The reversing valve 74 in FIG. 3 has a dual valve spool 62a which is similar to the previously described valve spool 62 of FIG. 2, but the valve spool 62a is adapted to be reciprocated between its two limit positions by fluid pressure. For this purpose the valve spool 62a is slidingly mounted in a cylindrical bore 80 and the opposite ends of the bore are connected to lines 82 and 84, respectively, that are connected to the pilot valve 72. The pilot valve 72 is connected to the pressurized water pipeline 18a by a line 85. The pilot valve 72 is a 4-way valve having a spool 86 that carries an operating member 56b. The operating member 56b straddles the piston rod 15 of the hydraulic timer 10 for control in the previously described manner by a pair of spaced coil springs 58 backed by fixed collars 60. Snap action is ensured by a detent ball 63 engaging two circumferential detent grooves 65 alternately.

The opposite ends of a cylindrical bore 88 in which the spool 86 is mounted has corresponding drainage ports 90. Thus, when the spool 86 of the pilot valve moves to the rightward position that is shown in FIG. 3, it places the water line 85 in communication with the line 84 to cause leftward shift of the spool 62a of the reversing valve 74 thereby to cause reversal of both the hydraulic timer 10 and the hydraulic actuator 12. The leftward movement of the spool 62a of the reversing valve 74 expels water from the left end of the bore 80 of the reversing valve, which water is displaced through line 82 to the left end of the bore 88 of the pilot valve and out through the left drainage port 90 of the pilot valve.

The reversing valve 74 is connected to a pressure reducing valve 16 in the previously described manner by supply lines 66 and 67 with lines 68 and 69 connecting the reversing valve to the opposite ends of the cylinder 26 of the hydraulic timer 10 and with lines 70 and 71 connecting the reversing valve to the opposite ends of the cylinder 36 of the hydraulic actuator 12. It is apparent that the system shown in FIG. 3 operates basically in the same manner as the system shown in FIGS. 1 and 2.

My description in specific detail of the selected embodiments of the invention will suggest to those skilled in the art various changes, substitutions and other departures from my disclosure within the spirit and scope of the appended claims.

I claim:

1. The combination with a pressurized pipeline for conveying fluid over terrain, of means to carry out a complete operating cycle with a given time interval between cycles, comprising:

operating means to carry out said operating cycle, said operating means being connected to the pipeline for actuation by the pressurized fluid;

a fluid-pressure-actuator means to measure said time interval, said measuring means being connected to the pipeline for actuation by the pressurized fluid, said measuring means having a reciprocative output member operable with opposite strokes which displaces a volume of fluid at a retarded rate on each of its opposite strokes; and means to reverse said output member automatically in response to each of its opposite strokes, said operating means being responsive to the measuring means for operation with said time interval between operations, said measuring means measuring said time interval on each of its opposite strokes, said operating means having a reciprocative output member operating with opposite strokes to carry out said operating cycle on each stroke, said operating means displacing a given volume of fluid on each stroke and including means to retard the displacement to determine the duration of the operating cycle, said reversing means comprising a reversing valve means responsive to each stroke of the measuring means, said valve means being operatively connected both to the measuring means and to the operating means to reverse the measuring means and the operating means on each stroke of the measuring means, said valve means including two 4-way valves to control the measuring means and the operating means respectively.

2. A combination as set forth in claim 1 in which the two 4-way valves are mechanically interconnected to operate in unison;

which includes fluid-pressure-actuated means to shift the valve spools between limit positions;

and which includes a pilot valve to control said fluid-pressure-actuated means.

3. A combination as set forth in claim 2 which includes means to operate said pilot valve with a snap action.

4. The combination with a pressurized pipeline for conveying fluid over terrain, of means to carry out a complete operating cycle with a given time interval between cycles, comprising:

operating means to carry out said operating cycle, said operating means being connected to the pipeline for actuation by the pressurized fluid;

a fluid-pressure-actuated means to measure said time interval, said measuring means being connected to the pipeline for actuation by the pressurized fluid, said measuring means having a reciprocative output member operable with opposite strokes which displaces a volume of fluid at a retarded rate on each of its opposite strokes; and means to reverse said output member automatically in response to each of its opposite strokes, said operating means being responsive to the measuring means for operation with said time interval between operations, said measuring means measuring said time interval on each of its opposite strokes, said operating means having a reciprocative output member operating with opposite strokes to carry out said operating cycle on each stroke, said operating means displacing a given volume of fluid on each stroke and including means to retard the displacement to determine the duration of the operating cycle, said operating means including a cylinder containing a fluid and a piston reciprocative in the cylinder to displace fluid from one face to the opposite face of the piston;

means connected to the piston to carry out said operating cycle during a given portion of each stroke of the piston; and means to restrict the displacement of the fluid from one face to the other of the piston during said portion of each stroke of the piston to prolong the operating cycle.

5. A combination as set forth in claim 4 in which said restricting means is adjustable to vary the duration of the operating cycle.

6. A combination as set forth in claim 4 in which the fluid is displaced through the clearance between the piston and the surrounding cylinder;

and in which the inner circumference of the cylinder is reduced in a region corresponding to said portion of the stroke of the piston to serve as said restricting means.

7. A combination as set forth in claim 4 which includes:
a cam operatively connected to said piston for movement thereby;
a follower cooperative with the cam; and means responsive to the follower to carry out said operating cycle.

8. The combination with a pressurized pipeline for conveying fluid over terrain, of means to carry out a complete operating cycle with a given time interval between cycles, comprising:
operating means to carry out said operating cycle, said operating means being connected to the pipeline for actuation by the pressurized fluid;
a fluid-pressure-actuated means to measure said time interval, said measuring means being connected to the pipeline for actuation by the pressurized fluid, said measuring means having a reciprocative output member operable with opposite strokes which displaces a volume of fluid at a retarded rate on each of its opposite strokes; and
means to reverse said output member automatically in response to each of its opposite strokes,
said operating means being responsive to the measuring means for operation with said time interval between operations,
one of said operating means and said measuring means comprising the following:
a first cylinder and second cylinder;
a drive piston in the first cylinder;
a driven piston in the second cylinder connected to the drive piston for actuation thereby;
a reversing valve;
means to supply pressurized water to said first cylinder from said pipeline through said reversing valve to reciprocate the drive piston,
said reversing valve being responsive to the opposite strokes of the drive piston to cause continuous reciprocation of the two pistons;
a body of liquid in the second cylinder; and
a passage interconnecting the opposite ends of the second cylinder to by-pass the driven piston and to retard the movement of the driven piston.

9. A combination as set forth in claim 8 which includes means to variably restrict said passage to adjust the time required for the driven piston to move between its two limit positions.

* * * * *